(12) United States Patent
Newman et al.

(10) Patent No.: US 7,530,510 B2
(45) Date of Patent: May 12, 2009

(54) STORAGE FOOD PROCESSOR (75) Inventors: Dobridge Celeste Newman, Glen Allen, VA (US); Michael Garman, Stafford, VA (US); George William Stamper, III, Quinton, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 278 days.

(21) Appl. No.: 11/082,580

(22) Filed: Mar. 17, 2005

(65) Prior Publication Data

US 2005/0207273 A1 Sep. 22, 2005

Related U.S. Application Data (60) Provisional application No. 60/554,759, filed on Mar. 19, 2004.

(51) Int. Cl.
*B02C 17/02* (2006.01)
*B07B 13/00* (2006.01)

(52) U.S. Cl. .......................................... 241/92; 241/37.5
(58) Field of Classification Search .................. 241/92, 241/37.5, 282.1, 282.2
See application file for complete search history.

(56) References Cited

U.S. PATENT DOCUMENTS

| | | | |
|---|---|---|---|
| 43,374 | A | 6/1864 | Witmer |
| 1,406,761 | A | 2/1922 | Rusnak |
| D189,680 | S | 1/1961 | Chapman et al. |
| 3,221,997 | A | 12/1965 | Smit |
| 3,809,325 | A | 5/1974 | Marrie |
| 3,892,365 | A | 7/1975 | Verdun |
| 4,081,145 | A | 3/1978 | Moe et al. |
| 4,190,208 | A | 2/1980 | Schaeffer et al. |
| 4,194,697 | A | * 3/1980 | Lembeck ...................... 241/92 |

(Continued)

FOREIGN PATENT DOCUMENTS

EP 0 081 874 B2 12/1982

(Continued)

OTHER PUBLICATIONS

Westinghouse, Salad Xpress Salad Spinner; http://housewares.smartbargains.com; 2 pages, (Oct. 19, 2004).

(Continued)

*Primary Examiner*—Bena Miller
(74) *Attorney, Agent, or Firm*—Panitch Schwarze Belisario & Nadel LLP (57) ABSTRACT A food processor for processing foodstuffs includes a housing with a motor disposed therein. The motor causes rotation of an output shaft extending outwardly from the housing. At least one food processing tool is removably engageable with the output shaft to rotate therewith. At least two interchangeable storage containers individually attach with the housing. An open end of the storage containers is attached to the housing, so that, with one of the storage containers attached to the housing, the at least one food processing tool extends toward the open end and at least proximate the interior of the attached storage container for the processing of foodstuffs therein. The storage container is detachable from the housing to store the processed foodstuffs therein, and another storage container is attachable to the housing for the processing of other foodstuffs within an interior of the other storage container.

29 Claims, 5 Drawing Sheets

U.S. PATENT DOCUMENTS

| | | | |
|---|---|---|---|
| 4,196,660 A | | 4/1980 | Steinberg |
| 4,216,917 A | * | 8/1980 | Clare et al. ................ 241/37.5 |
| 4,226,373 A | * | 10/1980 | Williams ................... 241/37.5 |
| 4,256,265 A | | 3/1981 | Madan |
| 4,297,038 A | | 10/1981 | Falkenbach |
| 4,335,860 A | * | 6/1982 | Grandel et al. .............. 241/37.5 |
| 4,362,277 A | | 12/1982 | Amiot |
| 4,371,118 A | | 2/1983 | Sontheimer et al. |
| 4,387,860 A | | 6/1983 | Necas et al. |
| 4,456,185 A | | 6/1984 | Ribassin et al. |
| 4,471,915 A | | 9/1984 | Levin et al. |
| 4,487,509 A | | 12/1984 | Boyce |
| 4,506,836 A | | 3/1985 | Williams |
| 4,512,522 A | * | 4/1985 | Williams ................... 241/37.5 |
| 4,523,720 A | * | 6/1985 | Behringer et al. .......... 241/37.5 |
| 4,542,857 A | | 9/1985 | Akasaka |
| 4,572,445 A | | 2/1986 | Cristante |
| 4,614,306 A | * | 9/1986 | Doggett ..................... 241/37.5 |
| 4,623,097 A | | 11/1986 | Sontheimer |
| 4,629,131 A | * | 12/1986 | Podell ......................... 241/36 |
| 4,681,031 A | | 7/1987 | Austad |
| 4,691,870 A | | 9/1987 | Fukunaga et al. |
| 4,700,903 A | * | 10/1987 | Henn ....................... 241/101.2 |
| 4,706,896 A | | 11/1987 | Moon-Kau |
| 4,708,487 A | | 11/1987 | Marshall |
| 4,741,482 A | | 5/1988 | Coggiola et al. |
| 4,799,626 A | | 1/1989 | Hickel et al. |
| 4,813,624 A | | 3/1989 | Williams |
| 4,824,029 A | * | 4/1989 | Stottmann et al. .......... 241/37.5 |
| 4,921,174 A | | 5/1990 | Okada et al. |
| 4,921,175 A | | 5/1990 | Okada et al. |
| 5,037,033 A | * | 8/1991 | Stottmann et al. .......... 241/37.5 |
| D320,721 S | | 10/1991 | Machuron |
| D331,170 S | | 11/1992 | Greiner |
| 5,244,275 A | | 9/1993 | Bauer et al. |
| 5,289,760 A | | 3/1994 | Barradas |
| 5,289,763 A | | 3/1994 | Le Rouzic et al. |
| 5,347,205 A | | 9/1994 | Piland |
| 5,355,784 A | | 10/1994 | Franklin et al. |
| 5,360,170 A | | 11/1994 | Cartellone |
| 5,395,060 A | | 3/1995 | Hackel et al. |
| 5,435,237 A | | 7/1995 | Huang |
| D361,694 S | | 8/1995 | Wong |
| 5,454,299 A | | 10/1995 | Gonneaud |
| D369,944 S | | 5/1996 | Cartellone |
| D372,397 S | | 8/1996 | Littmann et al. |
| 5,735,193 A | | 4/1998 | Chang |
| 5,768,978 A | | 6/1998 | Dörner et al. |
| D396,991 S | | 8/1998 | Lallemand |
| D396,992 S | | 8/1998 | Lallemand |
| D400,050 S | | 10/1998 | Littmann |
| 5,819,641 A | | 10/1998 | Hsu |
| 5,852,965 A | | 12/1998 | Kim |
| D404,253 S | | 1/1999 | Littmann |
| 5,896,812 A | | 4/1999 | Basora et al. |
| 5,921,485 A | | 7/1999 | Plavcan et al. |
| 5,934,179 A | | 8/1999 | Schmid et al. |
| D413,761 S | | 9/1999 | Conran et al. |
| 5,960,709 A | * | 10/1999 | Yip ............................. 99/510 |
| D415,938 S | | 11/1999 | Blaise |
| 6,082,648 A | | 7/2000 | Marriere et al. |
| 6,089,746 A | | 7/2000 | Martin |
| 6,103,291 A | * | 8/2000 | Fernandez Tapia .......... 426/523 |
| D431,959 S | | 10/2000 | Lallemand |
| 6,155,161 A | | 12/2000 | Chan |
| D437,730 S | | 2/2001 | Littmann |
| 6,186,425 B1 | | 2/2001 | Celso De Almeida Mattos |
| 6,213,007 B1 | | 4/2001 | Lande |
| D442,022 S | | 5/2001 | Prat |
| D447,381 S | | 9/2001 | Littmann |
| 6,375,102 B1 | | 4/2002 | Bouleau et al. |
| 6,418,837 B1 | | 7/2002 | Obersteiner |
| D469,303 S | | 1/2003 | Au |
| 6,513,966 B1 | | 2/2003 | Gort-Barten et al. |
| 6,540,394 B2 | | 4/2003 | Juriga |
| 6,554,466 B1 | | 4/2003 | Lee |
| D474,369 S | | 5/2003 | Benzon et al. |
| 6,588,322 B2 | | 7/2003 | Pavlovic et al. |
| 6,622,618 B2 | | 9/2003 | Glucksman et al. |
| 6,637,681 B1 | | 10/2003 | Planca et al. |
| 6,640,698 B2 | | 11/2003 | Pavlovic et al. |
| D483,987 S | | 12/2003 | Mauch |
| 6,655,265 B2 | | 12/2003 | Pavlovic et al. |
| 6,669,124 B2 | | 12/2003 | Lazzer et al. |
| 6,676,051 B2 | | 1/2004 | Rebordosa et al. |
| D488,344 S | | 4/2004 | Seum et al. |
| 6,748,853 B1 | | 6/2004 | Brady et al. |
| 6,761,326 B2 | | 7/2004 | Astegno et al. |
| 6,776,086 B1 | | 8/2004 | Chang Chien |
| 6,786,141 B2 | | 9/2004 | Tompa et al. |
| 6,845,932 B2 | | 1/2005 | Rüttimann |
| 6,971,597 B2 | * | 12/2005 | Starr ............................ 241/92 |
| 2002/0096585 A1 | | 7/2002 | Unteregger |
| 2003/0071150 A1 | | 4/2003 | Ruttimann |
| 2003/0071152 A1 | | 4/2003 | Astegno et al. |

FOREIGN PATENT DOCUMENTS

| | | |
|---|---|---|
| FR | 2 545 712 A3 | 4/1984 |
| GB | 2 249 368 A | 5/1992 |
| WO | 9824350 | 6/1998 |

OTHER PUBLICATIONS

Comfort, Food Processor; http://consumer.philips.com, 1 page, (Oct. 19, 2004).

"Notification of First Office Action", dated May 30, 2008, issued by the State Intellectual Property Office of the People's Republic of China for Chinese Patent Application No. 200510054992.7.

"Use and Care Book for Black & Decker Chopper", (pages from website link www.blackanddeckerappliances.com/dyn/prod/user-guide/78/EHC650.pdf) Household Products Inc., Pub. No. 175458-00-RV01, Made and Printed in Peoples Republic of China (Copyright 2000).

* cited by examiner

STORAGE FOOD PROCESSOR

CROSS-REFERENCE TO RELATED APPLICATIONS

This patent application claims priority to U.S. Provisional Patent Application Ser. No. 60/554,759, filed Mar. 19, 2004, entitled "Storage Food Processor", the disclosure of which is incorporated herein by reference.

BACKGROUND OF THE INVENTION

The present invention relates to food processors and, in particular, to a storage food processor for use with a plurality of storage containers.

Food processors and food choppers are popular household appliances for performing various actions upon food such as chopping, mixing, grinding, and other similar actions. Conventional food processors have performed such actions on food placed into a processing container sold as part of the food processor and specifically designed for use as part of the food processor.

BRIEF SUMMARY OF THE INVENTION

Briefly stated, the present invention is a food processor for processing foodstuffs. The food processor comprises a housing. A motor is disposed within the housing. An output shaft extends outwardly from the housing. The output shaft is operably connected with the motor, such that operation of the motor causes the output shaft to rotate. At least one food processing tool is removably engageable with the output shaft to rotate therewith. There are at least two interchangeable storage containers. Each storage container is for individual attachment with the housing. Each storage container has an open end and an interior. The open end of the storage containers is attached to the housing, so that, with one of the storage containers attached to the housing, the at least one food processing tool extends toward the open end and at least proximate the interior of the attached storage container for the processing of foodstuffs therein. The storage container is detachable from the housing to store the processed foodstuffs therein, and another storage container is attachable to the housing for the processing of other foodstuffs within an interior of the other storage container.

In another aspect, the present invention is a combination food processor and interlock mechanism therefore. The combination comprises a food processor and an interlock mechanism. The food processor includes a housing. A lid is removably engaged with the housing. A container is removably engaged with the lid. A motor is disposed within the housing. An output shaft extends outwardly from the housing. The output shaft is operably connected with the motor, such that operation of the motor causes the output shaft to rotate. At least one food processing tool is removably engageable with the output shaft to rotate therewith within the container. The interlock mechanism includes a movable switch operably coupled with the motor and a pivotable lever arm. Engagement of the housing with the lid causes the switch to move from a first disengaged position where the switch cannot be actuated by the lever arm to a second engaged position where the switch can be actuated by the lever arm. Engagement of the attached lid and housing with the container causes the lever arm to pivot into contact with the switch in the second engaged position to close the switch and allow operation of the motor.

In another aspect, the present invention is a method of processing and storing foodstuffs using a food processor. The food processor includes a housing. A motor is disposed within the housing. An output shaft extends outwardly from the housing. The output shaft is operably connected with the motor, such that operation of the motor causes the output shaft to rotate. At least one food processing tool is removably engageable with the output shaft to rotate therewith. The method comprises the steps of operably engaging the housing with an open end of a first storage container, such that the at least one food processing tool extends through the open end and within an interior of the first storage container. First foodstuffs are processed within the first storage container. The first storage container is separated from the housing. The first storage container is stored with the processed first foodstuffs therein. The housing is operably engaged with an open end of a second storage container, such that the at least one food processing tool extends through the open end and within an interior of the second storage container. Second foodstuffs are processed within the second storage container. The second storage container is separated from the housing. The second storage container is stored with the processed second foodstuffs therein.

In another aspect, the present invention is a food processor for processing foodstuffs. The food processor comprises a housing. A motor is disposed within the housing. An output shaft extends outwardly from the housing. The output shaft is operably connected with the motor, such that operation of the motor causes the output shaft to rotate. At least one food processing tool is removably engageable with the output shaft to rotate therewith. There is at least one storage container for attachment with the housing. The storage container has an open end and an interior. The housing is attached proximate the open end of the storage container, so that, with the storage container attached to the housing, the at least one food processing tool extends through the open end and within the interior of the storage container for the processing of foodstuffs therein. The storage container is detachable from the housing to store the processed foodstuffs therein. The storage container includes at least one storage lid removably engageable with the open end of the storage container for enclosing the interior of the storage container when the storage container is detached from the housing.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Certain terminology is used in the following description for convenience only and is not limiting. The words "right", "left", "upper", and "lower" designate directions in the drawings to which reference is made. The terminology includes the words above specifically mentioned, derivatives thereof, and words of similar import.

Figure 1:
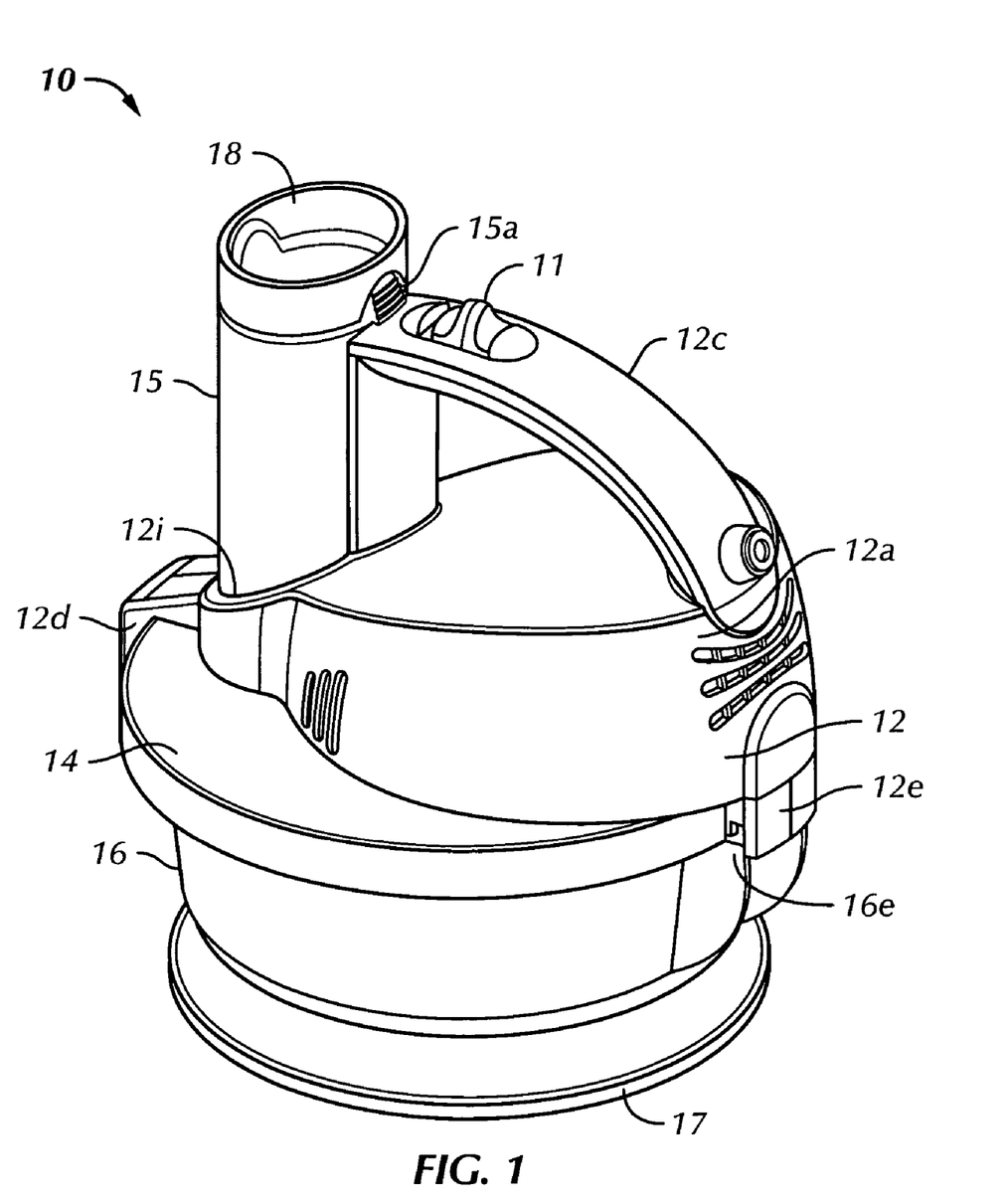
FIG. 1 is a top right perspective view of a food processor in accordance with a first preferred embodiment of the present invention.
Figure 2:
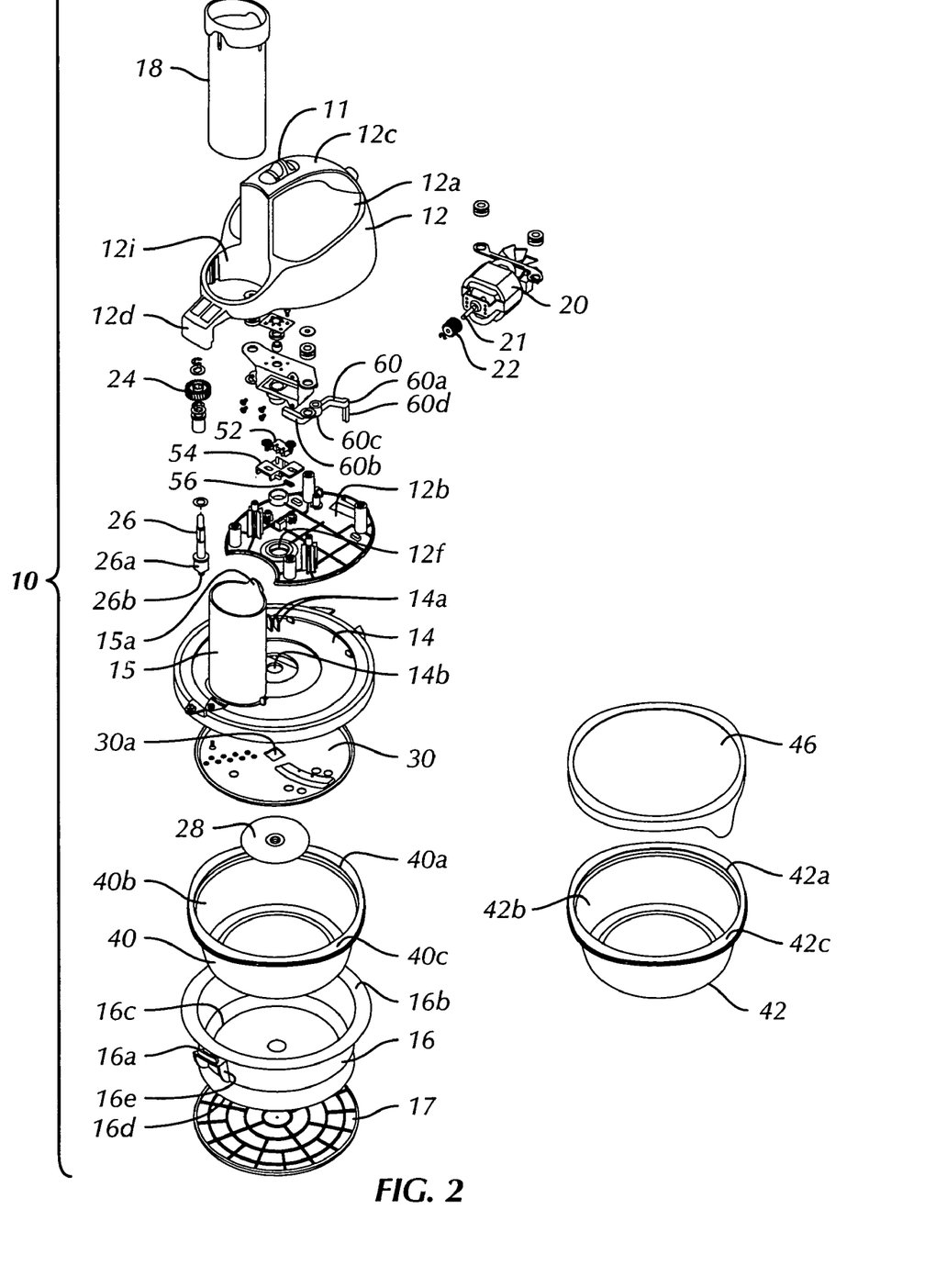
FIG. 2 is an exploded perspective view of the food processor of FIG. 1 with first and second storage containers and a storage lid.
Figure 3:
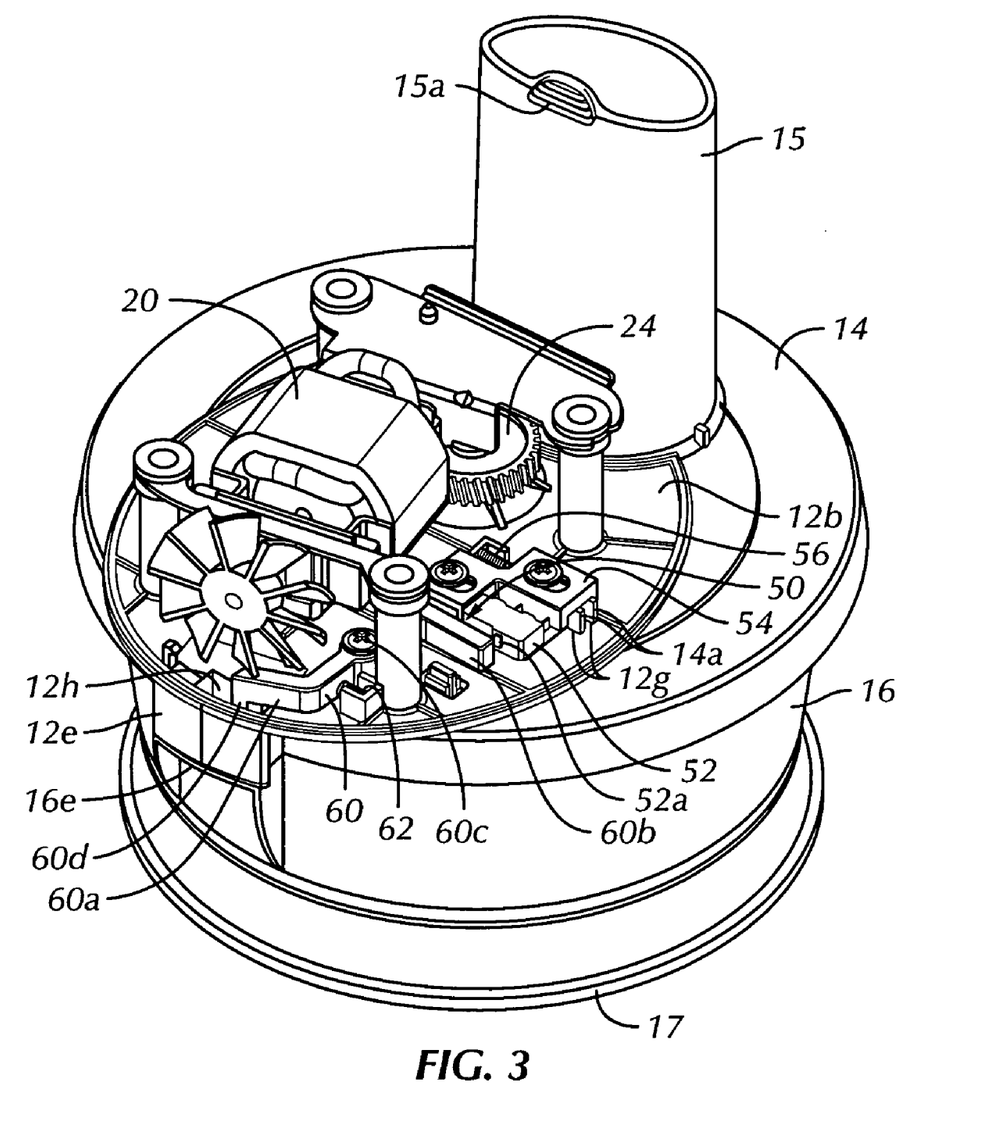
FIG. 3 is a top left perspective view of the food processor of FIG. 1 having a top cover of a housing and a food pusher removed.

Referring to the drawings in detail, wherein like numerals indicate like elements throughout, there is shown in FIGS. 1-3 a first preferred embodiment of a food processor, indicated generally at 10, for processing foodstuffs (not shown) that can optionally use storage containers 40, 42 of a standard size that may not be sufficiently rigid for use as a processing bowl without additional support. Examples of such storage containers 40, 42 are semi-permanent or disposable polymeric, preferably plastic, storage containers marketed under the GLAD® and ZIPLOC® brands, although other brands of containers or containers made from other materials can be used. Although shown as bowls in FIG. 2, it is within the spirit and scope of the present invention that the first and second storage containers 40, 42 take other desirable forms, including flexible plastic bags and other storage container types known in the art. The first and second storage containers 40, 42 will be described in greater detail below.

Referring to FIGS. 1 and 2, the food processor 10 includes a housing 12 having a motor 20, preferably electric, disposed within. Preferably, the housing 12 is generally ovular in plan view and has a generally flat bottom portion 12b with a top cover 12a attached thereto to substantially enclose the motor 20 therein. An arcuate handle 12c preferably extends at least partially along a top of the top cover 12a to enable a user to pick up and carry the housing 12. A button or switch 11 is preferably disposed on the handle 12c for selective powering of the food processor 10.

An output shaft 26 extends at least partially outwardly from the housing 12 through a hole 12f in the bottom portion 12b of the housing 12. The output shaft 26 is operably connected with the motor 20, such that operation of the motor 20 causes the output shaft 26 to rotate. Preferably, the motor 20 has a drive shaft 21 extending outwardly therefrom, the drive shaft 21 rotating in at least one direction when the motor 20 is powered. A worm 22 is preferably fixed to the drive shaft 21 to rotate therewith. The worm 22 engages with a worm gear 24 rotatably fixed with the output shaft 26, such that rotation of the worm 22 causes the worm gear 24 and output shaft 26 to rotate. In this way, powering of the motor 20 causes rotation of the output shaft 26. Additionally, the worm 22 and worm gear 24 combination provides for speed reduction between the motor 20 and the output shaft 26. Although this configuration is preferred, it is within the spirit and scope of the present invention that the motor 20 be operably connected to the output shaft 26 in a different manner, such as, but not limited to, a pulley and belt assembly (not shown), a sprocket and chain configuration (not shown), a series of spur or other gears (not shown), or a direct drive configuration (not shown) in which the output shaft extends directly from the motor, for instance.

The housing 12 is preferably removably engaged with a separate lid 14. Preferably, the lid 14 is generally circular in plan view, having a substantially flat top surface against which the bottom portion 12b of the housing 12 abuts. The lid 14 has a hole 14b therethrough, which corresponds to the hole 12f of the housing 12, such that the output shaft 26 extends at least partially through the hole 14b of the lid 14 when the housing 12 is engaged with the lid 14. The lid 14 preferably has a generally tubular feed chute 15 extending outwardly from the top surface of the lid 14, the lid 14 having a corresponding opening (not shown) therethrough at the location of the feed chute 15 to allow foodstuffs to be inserted into the feed chute 15 and pass through the lid 14 in order to process the foodstuffs, as will be described below. A complementarily shaped pusher 18 is insertable within the feed chute 15 in order to urge foodstuffs through the feed chute 15, as is known in the food processor art. The feed chute 15 preferably extends through a front hole 12i in the housing 12.

Preferably, a deflectable release latch 15a is disposed proximate a top of the feed chute 15, such that the latch 15a engages a top of the handle 12c when the housing 12 is engaged with the lid 14 in order to retain the housing 12 in engagement with the lid 14. To release the lid 14, the latch 15a is deflected slightly toward a center of the feed chute 15 to clear the top of the handle 12c and allow the housing 12 to be separated from the lid 14. Although the latch 15a is preferred, it is not intended to be limiting as other engagement methods known in the art may be used, provided the housing 12 and lid 14 are able to be releasably engaged. Additionally, although it is preferable to have the housing 12 separate from the lid 14, it is within the spirit and scope of the present invention that the lid 14 and housing 12 be integrally formed or be more permanently secured together.

Referring specifically to FIG. 2, at least one food processing tool 30 is removably engageable with the output shaft 26 to rotate therewith. Although the tool 30 is portrayed as a slicer disk, it is not intended to be so limited, as it is within the spirit and scope of the present invention that the tool 30 be any of a number of different food processing tools, such as a shredder disk (not shown), a grinder blade or disk (not shown), a mixer disk (not shown), or a slicer blade (not shown), for instance. The tool 30 preferably has a hole 30a therein, which engages a tool interface 26a of the output shaft 26. The tool interface 26a preferably forms a part of the output shaft 26 that extends outwardly from the housing 12. Preferably, the tool interface 26a is square in shape, when viewed from below, and the hole 30a has a corresponding shape, in order to rotationally fix the tool 30 with the output shaft 26. Although it is preferable that the tool interface 26a and hole 30a be square in shape, this is not intended to be limiting, as it is contemplated that the tool interface 26a and hole 30a be of other shapes (not shown), such as rectangular, diamond-shaped, triangular, or star-shaped, for instance, or that other methods be used to rotationally fix the tool 30 with the output shaft 26, such as tab-in-slot and/or pin-in-slot configurations, for instance.

Once the tool 30 is placed on the output shaft 26, preferably, a nut 28 is tightened onto a fastener 26b in an exposed end of the output shaft 26. The nut 28 is preferably a relatively large disk rather than a small conventional nut (such as a hex nut, wing nut, or the like) to reduce the likelihood of injury when tightening the nut 28. That is, when tightening the tool 30 onto the output shaft 26, the large disk-like nut 28 acts to at least partially protect fingers of the user from coming into contact with sharp surfaces of the tool 30. Although this is preferred, it is within the spirit and scope of the present invention that another method of retaining the tool 30 on the output shaft 26 be used.

Referring to FIGS. 1-3, the food processor further includes a relatively rigid outer container 16 for attachment with the lid 14 and housing 12. The outer container 16 is preferably bowl-shaped, having an open end 16b and an interior 16c accessible through the open end 16b. Preferably, the outer container 16 is sized and shaped to individually receive the first and second storage containers 40, 42, one at a time, such that the first and second storage containers 40, 42 are individually retained within the outer container 16 during the processing of foodstuffs, as will be described below. The outer container 16 preferably has a compartment 16d within a bottom of the outer container 16 within which can be stored the tool 30 or additional food processing tools (not shown) when not being used. Preferably, a compartment closure 17 is removably engageable with the bottom of the outer container 16 to enclose the compartment 16d, thereby retaining the contents within the compartment 16d. Although portrayed with the compartment 16d, it is within the spirit and scope of the present invention that the outer container 16 have no compartment or that the compartment be configured differently from what is portrayed and described herein.

Front and back clips 12d, 12e preferably extend downwardly from a peripheral edge at opposing sides of the housing 12, and a pair of lock arms 16e extend outwardly from opposite sides of the outer container 16 adjacent the rim of the outer container 16. The front and back clips 12d, 12e engage the lock arms 16e to secure the housing 12 and lid 14 to the outer container 16. Although this configuration is preferred, it is within the spirit and scope of the present invention that another configuration be used provided it functions as described herein to secure the housing 12, lid 14, and outer container 16.

Referring to FIG. 2, as mentioned above, the food processor 10 is intended to be used with at least one storage container 40, or, preferably, a plurality (two or more) of interchangeable storage containers 40, 42. Each of the storage containers 40, 42 includes an open end 40a, 42a and an interior 40b, 42b within, accessible through the open end 40a, 42a. Although shown with only first and second storage containers 40, 42, this is done merely for illustrative purposes, as it is within the spirit and scope of the present invention that any number of storage containers 40, 42 be used with the food processor 10. As stated above, although shown and described as bowls, this is not intended to be limiting, as it is within the spirit and scope of the present invention that the storage containers 40, 42 be other types of containers, provided they can function to retain foodstuffs therein during the processing thereof.

One of the first and second storage containers 40, 42 is preferably disposed within the outer container 16 during use of the food processor 10. For the purposes of this description, only use of the first storage container 40 with the container 16 will be discussed. However, it should be noted that the following description applies equally to each of the storage containers 40, 42 contemplated for use with the food processor 10. Preferably, a bottom of the first storage container 40 rests on a bottom of the interior 16c of the outer container 16 to support the first storage container 40 within the outer container 16. A rim 40c around the open end 40a of the first storage container 40 is preferably disposed above the open end 16b of the outer container 16. When engaged with the outer container 16, the lid 14 then preferably encloses the rim 40c of the first storage container 40, such that the rim 40c is essentially sandwiched between the lid 14 and the container 16. Although this configuration is preferred, it is within the spirit and scope of the present invention that the first storage container 40 be supported by the outer container 16 in a different manner, such as hanging the rim 40c of the first storage container 40 on the open end 16b of the outer container 16 so that the bottom of the first storage container 40 is disposed above the bottom of the interior 16c of the outer container 16, for instance.

The first storage container 40 is typically less rigid than the outer container 16. That is, it is preferable that the outer container 16 have greater rigidity than that of the first storage container 40. Therefore, disposing the first storage container 40 within the outer container 16 in the manner described above provides increased strength and rigidity to the first storage container 40 being used therewith. However, it is not required that the first storage container 40 be less rigid than the outer container 16, as use of a storage container which is of the same or greater rigidity than the outer container 16 is possible and is therefore contemplated by the present invention.

Once the first storage container 40 is placed within the outer container 16, assembly of the food processor 10 is completed by engaging the lid 14, with the housing 12 attached thereto, with the container 16 so that the housing 12 is disposed proximate and above the open end 40a of the first storage container 40. Preferably, the tool 30 engaged with the output shaft 26 extends toward the open end 40a and at least proximate the interior 40b of the first storage container 40. More particularly, the tool 30 is at least partially within the interior 40b of the first storage container 40. Although this configuration is preferred, it is within the spirit and scope of the present invention that the tool 30 be oriented differently with respect to the first storage container 40. For instance, the tool 30 can be disposed above the open end 40a and proximate the interior 40b of the first storage container 40, or the tool 30 can be positioned deep within the interior 40b.

Foodstuffs are then placed into the feed chute 15 while the tool 30 is rotating to be processed. The processed foodstuffs then fall into the interior 40b of the first storage container 40. It should be noted that the first storage container 40 need not completely fill the outer container 16, so long as the tool 30 used to perform the desired processing of foodstuffs avoid contact with the first storage container 40.

Once processing of the desired amount of foodstuffs is completed, the lid 14 and housing 12 can be disengaged from the outer container 16 and the first storage container 40 removed from within the interior 16c of the outer container 16 to remove the processed foodstuffs from within the food processor 10. The processed foodstuffs can then be stored within the first storage container 40 separate from the food processor 10 to allow other foodstuffs to be processed using another storage container, such as the second storage container 42, or, alternatively using only the outer container 16 with no other storage container placed therein to allow the food processor 10 to be used to process foodstuffs directly in the outer container 16. Preferably, at least one storage lid 46 is removably engageable with the open end 40a of the first storage container 40 for enclosing the interior 40b of the first storage container 40 when the first storage container 40 is detached from the housing 12, lid 14, and container 16 of the food processor 10.

Referring to FIG. 3, preferably, the food processor 10 further includes an interlock mechanism 50 operably coupled with the motor 20 for allowing operation of the motor 20 only when the lid 14 is attached to the outer container 16 and the housing 12 is engaged with the lid 14. The interlock mechanism 50 preferably includes a movable switch 52 and a pivotable lever arm 60, such that engagement of the housing 12 with the lid 14 causes the switch 52 to move from a first disengaged position where the switch 52 cannot be actuated by the lever arm 60 to a second engaged position where the switch 52 can be actuated by the lever arm 60. That is, engagement of the attached lid 14 and housing 12 with the container 16 causes the lever arm 60 to rotate into contact with the switch 52 in the second engaged position to close a contact 52*a* of the switch 52 and allow operation of the motor 20.

The switch 52 is preferably fixed to a switch carriage 54 which is slidably attached to the bottom portion 12*b* of the housing 12. A spring 56 preferably biases the switch carriage 54 in the first disengaged position. The lever arm 60 preferably has a first end 60*a* and a second end 60*b* and is rotatably engaged to the bottom portion 12*b* of the housing 12 at a pivot 60*c*. The lever arm 60 is preferably generally S-shaped with the pivot 60*c* being generally at a center of the lever arm 60. The first end 60*a* of the lever arm 60 preferably has an extension 60*d* extending generally perpendicularly therefrom. The lever arm 60 preferably has a first disengaged position, in which the second end 60*b* of the lever arm 60 is spaced from the switch 52, and a second engaged position, in which the second end 60*b* of the lever arm 60 abuts the switch 52. A spring 62 preferably biases the lever arm 60 in the first disengaged position.

Preferably, the interlock mechanism 50 operates as follows. At least one generally shark-fin-shaped tab 14*a*, and preferably two tabs 14*a*, extends outwardly from a top surface of the lid 14. The tabs 14*a* extend through corresponding tab slots 12*g* in the bottom portion 12*b* of the housing 12 to abut and urge the switch carriage 54 and switch 52 from the first disengaged position to the second engaged position with engagement of the housing 12 with the lid 14. The container 16 preferably includes a generally elongate protrusion 16*a* extending upwardly from at least one of the lock arms 16*e*, which abuts the extension 60*d* of the lever arm 60 extending through a lever arm slot 12*h* in the bottom portion 12*b* of the housing 12. The protrusion 16*a* causes the lever arm 60 to pivot with engagement of the attached lid 14 and housing 12 with the outer container 16, thereby rotating the second end 60*b* of the lever arm 60 to abut the contact 52*a* of the switch 52 to close the switch 52 and allow the motor 20 to be powered. In this way, the interlock mechanism 50 operates to inhibit operation of the food processor 10 unless the housing 12 is mounted to the lid 14 and the attached housing 12 and lid 14 are mounted to the outer container 16. That is, the interlock mechanism 50 inhibits the user from operating the at least one tool 30 unless the tool 30 is secured within the outer housing 16 to lessen the likelihood of the user from being cut by the tool 30.

Although the above-described interlock mechanism 50 is preferred, it is within the spirit and scope of the present invention that other interlock mechanisms may be used, provided they function to inhibit operation of the food processor 10 unless the food processor 10 is assembled, as described herein. For instance, downward pressure by the user on the housing 12 when in place could trigger a switch (not shown) to power the motor 20, using techniques known in the art. Alternatively, if flexible containers such as plastic bags are used for the storage containers 40, 42, a mechanism (not shown) can be provided to hold the flexible container in place on the outer container 16.

Referring to FIGS. 1-3, the housing 12, lid 14 and outer housing 16 of the food processor 10 may be disassembled or disengaged for cleaning purposes and to permit removal of foodstuff from within the outer container 16. In operation, one of the first and second storage containers 40, 42 is positioned within the outer container 16, the lid 14 is mounted to the housing 12 by sliding the feed chute 15 through the front hole 12*i* in the housing 12 and the tool 30 is mounted to the output shaft 26. When the lid 14 is mounted to the housing 12, the tabs 14*a* enter the tab slots 12*g* to urge the switch carriage 54 and switch 52 from the first disengaged position to the second engaged position against the force of the switch spring 56. The lid 14 is then positioned on open end 16*b* of the outer container 16 and the housing 12 is rotated in a clockwise direction such that the front and back clips 12*d,* 12*e* of the housing 12 engage the lock arms 16*e* of the outer container 16, thereby securing the outer container 16 to the housing 12. When the outer container 16 is secured to the housing 12, the protrusion 16*a* engages the extension 60*d* of the lever arm 60 extending through the lever arm slot 12*h* to urge the lever arm 60 to pivot from the first disengaged position to the second engaged position. If the switch carriage 54 and switch 52 are in the second engaged position, the second end 60*b* of the lever arm 60 abuts the contact 52*a* to close the switch 52, thereby closing a circuit so that the motor 20 may be powered. If the switch carriage 54 and switch 52 are not in the second engaged position, indicating that the lid 14 is not properly mounted to the housing 12, the lever arm 60 does not contact and close the switch 52. When the switch 52 is closed, the tool 30 is operated by actuating the switch or button 11. Foodstuff is inserted through the feed chute 15 onto the tool 30 and is processed into the attached storage container 40, 42. Once the desired amount of food processing has been completed, the food processor 10 can be at least partially disassembled to remove the storage container 40, 42 from within the outer container 16. The storage lid 46 can then be optionally placed on the open end 40*a,* 42*a* of the storage container 40, 42 to enclose the interior 40*b,* 42*b* of the storage container 40, 42 and the processed foodstuffs therein. Another storage container 40, 42 can then be placed within the outer container 16 and the food processor 10 can be reassembled to process additional foodstuffs therein.

Figure 4:
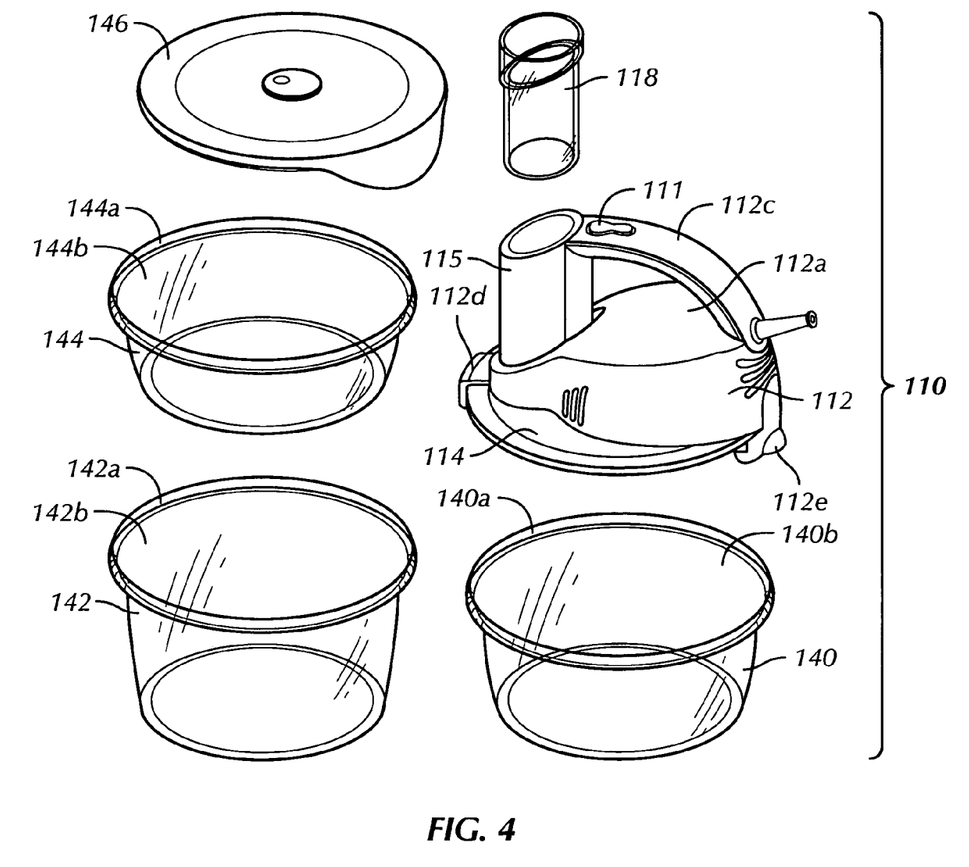
FIG. 4 is an exploded perspective view of a food processor in accordance with a second preferred embodiment of the present invention, the food processor having a plurality of storage containers and a storage lid.

Referring to FIG. 4, a food processor 110 according to a second preferred embodiment of the present invention preferably uses standard, widely available food storage containers 140, 142, 144. The food processor 110 is essentially similar to the food processor 10 of the first embodiment described above, except that the storage containers 140, 142, 144 are typically more rigid than the storage containers 40, 42 described above with respect to the first embodiment. As such, the food processor 110 requires no additional outer container 16 to provide increased strength and rigidity to the storage containers 140, 142, 144 being used therewith, and a lid 114 and housing 112 of the food processor 110 can be attached directly to one of the first, second, and third storage containers 140, 142, 144.

The lid 114 and housing 112 of the food processor 110 is preferably designed to work with a plurality of conventional relatively rigid storage containers 140, 142, 144 made from a glass material or a polymeric material, such as PYREX® brand or Rubbermaid® brand bowls, respectively, for instance, although other brands of containers or containers made from other materials can be used. Preferably, the housing 112 has front and back clips 112*d,* 112*e* for engagement with open ends 140*a,* 142*a,* 144*a* of the first, second, and third storage containers 140, 142, 144.

As shown in FIG. 4, the plurality of storage containers 140, 142, 144 are shown with varying volumes ranging, for instance, from one quart to five quarts, but with the same opening size and shape, such that a single container lid 146 can close or seal each of the storage containers 140, 142, 144. Although this is preferred, it is within the spirit and scope of the present invention that other volumes of storage containers 140, 142, 144 can also be used. In this embodiment, the food processor 110 can be marketed with or without a conventional bowl, using the consumer's pre-existing storage containers for that purpose. Furthermore, it is contemplated that multiple models of the food processor 110 can be produced, each configured to work with a different manufacturer, configuration, or size of storage containers 140, 142, 144.

An interlock mechanism (not shown), similar to that described above with respect to the first embodiment, is provided to disable a motor (not shown) of the food processor 110 when not fully assembled. That is, unless the housing 112 is engaged with the lid 114 and the attached housing 112 and lid 114 is mounted on one of the first, second, and third storage containers 140, 142, 144, the motor is unpowered to inhibit the motor from rotating a food processing tool (not shown, but substantially similar if not identical to the food processing tool 30 described above). Also, the interlock mechanism preferably operates to stop the food processing tool from rotating promptly, preferably within seconds, if the lid 114 and/or housing 112 are removed from one of the first, second, and third storage containers 140, 142, 144 during operation of the food processor 110 by disabling power to the motor upon disengaging the lid 114 and housing 112 from one of the first, second, and third storage containers 140, 142, 144.

Although not shown in FIG. 4, the food processor 110 is provided with multiple food processing tools, known in the art for chopping, mixing, etc. foodstuff within interiors 140*b*, 142*b*, 144*b* of the storage containers 140, 142, 144. The food processing tools are removably attachable to the output shaft of the food processor 110 using any desirable technique, such as that described above with respect to the first embodiment or any other technique known in the food processor art. Other conventional food processor features, such as a feed chute 115 and pusher 118, can be provided, but are not further described herein for clarity of the description.

Assembly and operation of the food processor 110 is substantially the same as that described above with respect to the first embodiment, except that, as stated above, no outer container is used with the food processor 110.

Figure 5:
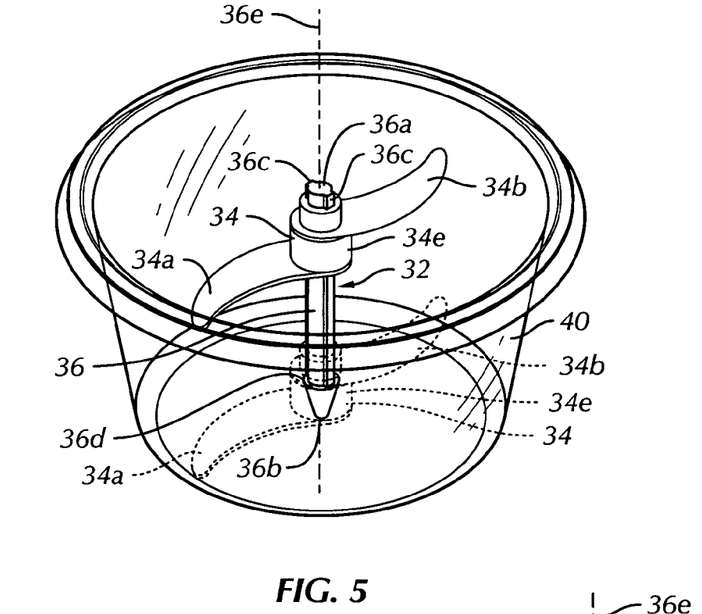
FIG. 5 is a top perspective view of a food processing tool for use with the food processors of FIGS. 1-4.
Figure 6:
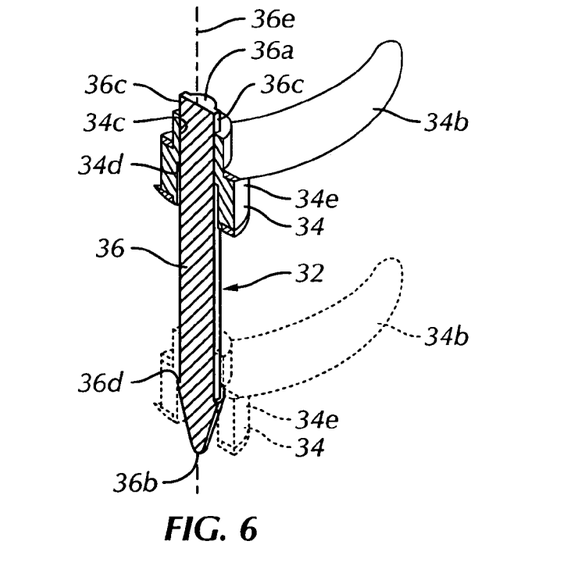
FIG. 6 is a cross-sectional perspective view of the food processing tool of FIG. 5.

Referring now to FIGS. 5 and 6, a "floating" food processing tool 32 can be used with the food processors 10, 110 of the first and second embodiments. Although shown as a S-blade tool 32, the "floating" food processor tool can take the form of any food processing tool known in the food processing art, such as a slicer disk, a mixer disk, a grinder blade, and a shredder disk, for instance. The "floating" tool 32 is manufactured in a configuration that allows the processing implement or S-blade 34 of the tool 32 to "float" or slide vertically along a tool shaft 36 that is driven by the output shaft 26 of the food processor 10, 110.

Any desirable technique for allowing the processing implement 34 to freely move vertically along the tool shaft 36 while rotating with the tool shaft 36 can be used. However, it is preferred that the S-blade 34 include first and second blades 34*a*, 34*b*, which are horizontally opposed to each other and are mounted on and vertically and circumferentially separated by a hub 34*e*. Although this arrangement is preferred, it is within the spirit and scope of the present invention that other processing implements and/or blade shapes be used. The tool shaft 36 includes axially extending ribs 36*c* to interengage with axially extending slots or insets 34*c* in the S-blade 34 to inhibit the S-blade 34 from rotating around the tool shaft 36. Although illustrated with two ribs 36*c* for this purpose, other shapes of the tool shaft 36 are contemplated, including shafts with flats (not shown) and square shafts (not shown), such that the S-blade 34 is inhibited from rotating around the tool shaft 36.

Preferably, the tool shaft 36 includes a first end 36*a* and a second free end 36*b* opposite the first end 36*a*. The first end 36*a* is preferably removably engaged with the output shaft 26 in a manner known in the food processing art, such that the tool shaft 36 rotates with the output shaft 26. Details of the manner of attachment are omitted for clarity of the drawings. The S-blade 34 is preferably slidable along the tool shaft 36 from a position proximate the first end 36*a* (shown in solid in FIGS. 5 and 6) to a position proximate the second end 36*b* (shown in phantom in FIGS. 5 and 6) due to at least one of interaction with the foodstuff being processed and gravity.

More specifically, the S-blade 36 is generally free to slide axially along a vertical axis 36*e* of the tool shaft 36. The S-blade 34 includes a shoulder 34*d* which abuts a shoulder 36*d* proximate the second end 36*b* of the tool shaft 36 to limit downward movement of the S-blade 34, inhibiting the S-blade 34 from making contact with the bottom of the storage container 40 or outer container 16 within which the "floating" tool 32 is used. To assist pushing the tool shaft 36 through foodstuff placed in the storage container 40 prior to insertion of the "floating" tool 32, the second end 36*b* can be shaped with a pointed tip or other similar shape.

Referring to FIGS. 5 and 6, in operation, the tool shaft 36 is pushed through foodstuffs (not shown) in the storage container 40, with the S-blade 34 supported by the foodstuff proximal to the first end 36*a* of the tool shaft 34 prior to operation of the food processor 10. Gravity and sharp edges of the first and second blades 34*a*, 34*b* chop the foodstuff in the storage container 40 and pull the S-blade 34 towards the bottom of the storage container 40 during processing to a finished position of the S-blade 34 after processing the foodstuff. The hub 34*e* of the S-blade 34 slides along the vertical axis 36*e* of the tool shaft 36 until the shoulder 34*d* of the hub 34*e* makes contact with the shoulder 36*d* of the tool shaft 36, allowing the S-blade 34 to get close to, but not contact, the bottom of the storage container 40.

Although this configuration of the "floating" tool 32 is preferred, it is within the spirit and scope of the present invention that other configurations be used. For instance, the processing implement can be vertically fixed or fixable with the tool shaft. A mechanism (not shown) could then allow the user to position and lock the processing implement at one of multiple vertical locations on the tool shaft. In other embodiments, the length of the tool shaft can be adjustably configured or a plurality of different length tool shafts (not shown) can be provided for attachment to the processing implements. Alternatively, a reciprocating mechanism (not shown) can be provided to allow vertical reciprocal movement of the processing implement and tool shaft while in operation or during setup of the food processor 10, 110. The reciprocating mechanism can be an automatic mechanism (not shown) driven by the food processor 10, 110, a manual mechanism (not shown) that involves action by the user of the food processor 10, 110 to perform the vertical movement, or a combination of automatic and manual mechanisms. Any desirable reciprocating mechanism can be used. The reciprocating mechanism allows positioning the processing implement as desired for processing foodstuffs in the food processor 10, 110.

In a further embodiment, the present invention is a method of processing and storing foodstuffs using the food processor 10, 110, as described above, including the following steps. The housing 12, 112 is operably engaged with the open end 40*a*, 140*a* of the first storage container 40, 140, such that the at least one food processing tool 30 extends through the open end 40*a*, 140*a* and within the interior 40*b*, 140*b* of the first storage container 40, 140. First foodstuffs (not shown) are then processed within the first storage container 40, 140. The first foodstuffs are preferably fed into the first storage container 40, 140 through the feed chute 15, 115, although it is within the spirit and scope of the present invention that the first foodstuffs be disposed within the first storage container 40, 140 prior to the housing 12, 112 being operably engaged with the open end 40a, 140a of the first storage container 40, 140. The first storage container 40, 140 is separated from the housing 12, 112. The first storage container 40, 140 is then stored with the processed first foodstuffs therein.

The housing 12, 112 is then operably engaged with the open end 42a, 142a of the second storage container 42, 142, such that the at least one food processing tool 30 extends through the open end 42a, 142a and within the interior 42b, 142b of the second storage container 42, 142. Second foodstuffs (not shown) are processed within the second storage container 42, 142. The second foodstuffs are preferably fed into the second storage container 42, 142 through the feed chute 15, 115, although it is within the spirit and scope of the present invention that the second foodstuffs be disposed within the second storage container 42, 142 prior to the housing 12, 112 being operably engaged with the open end 42a, 142a of the second storage container 42, 142. The second storage container 42, 142 is separated from the housing 12, 112. The second storage container 42, 142 is stored with the processed second foodstuffs therein. It is contemplated that the second storage container is sized differently than the first storage container.

The storage lid 46, 146 can optionally be used with at least one of the first and second storage containers 40, 42, 140, 142 to enclose the interiors 40b, 42b, 140b, 142b of the first and second storage containers 40, 42, 140, 142 with the first and second foodstuffs located therein, respectively, after the first and second storage containers 40, 42, 140, 142 have been separated from the housing 12, 112. Doing so provides for enhanced storage of the first and second foodstuffs within the first and second storage containers 40, 42, 140, 142, respectively.

With respect to the food processor 10 of the first embodiment, the above-described method preferably further includes placing the first storage container 40 within the outer container 16 and operably engaging the housing 12 with the open end 16b of the outer container 16, such that the at least one food processing tool 30 extends through the open end 40a and within the interior 40b of the first storage container 40. Subsequently, the method preferably further includes placing the second storage container 42 within the outer container 16 and operably engaging the housing 112 with the open end 16b of the outer container 16, such that the at least one food processing tool 30 extends through the open end 42a and within the interior 42b of the second storage container 42. The method preferably further includes engaging the lid 14 to the housing 12, with the lid 14 being removably engaged with the outer container 16 in order to operably engage the housing 12 with the open end 40a, 42a of each of the first and second storage containers 40, 42.

Although the above-described method of processing and storing foodstuffs using the food processor 10, 110 is preferred, it is within the spirit and scope of the present invention that different methods be used.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A food processor for processing foodstuffs, comprising:
   a housing having a top portion and a bottom portion;
   a motor disposed within the housing;
   a lid having a top surface removably engageable with the bottom portion of the housing;
   a feed chute extending outwardly from the top surface of the lid;
   an output shaft extending outwardly from the housing, the output shaft operably connected with the motor, such that operation of the motor causes the output shaft to rotate;
   at least one food processing tool removably engageable with the output shaft to rotate therewith; and
   at least two interchangeable storage containers, each storage container for individual attachment with the lid, each storage container having an open end and an interior, the open end of the storage containers being attached to the lid, so that, with one of the storage containers attached to the lid, the at least one food processing tool extends toward the open end and at least proximate the interior of the attached storage container for the processing of foodstuffs therein, wherein the storage container is detachable from the lid to store the processed foodstuffs therein, and another storage container is attachable to the lid for the processing of other foodstuffs within an interior of the other storage container.

2. The food processor of claim 1, wherein the storage containers are disposable.

3. The food processor of claim 1, further comprising a container for attachment with the lid, the container being sized and shaped to individually receive the storage containers, such that the storage containers are individually retained within the container during the processing of foodstuffs.

4. The food processor of claim 3, wherein the container includes a compartment for the storage of the at least one food processing tool when not being used to process foodstuffs.

5. The food processor of claim 4, wherein the container is more rigid than the storage containers.

6. The food processor of claim 3, wherein the container can be used without the storage container to process foodstuffs within the container.

7. The food processor of claim 3, wherein the lid is removably engageable with the container.

8. The food processor of claim 7, further comprising an interlock mechanism operably coupled with the motor for allowing operation of the motor only when the lid is attached to the container and the housing is engaged with the lid.

9. The food processor of claim 8, wherein the interlock mechanism includes a movable switch and a pivotable lever arm, such that engagement of the housing with the lid causes the switch to move from a first disengaged position where the switch cannot be actuated by the lever arm to a second engaged position where the switch can be actuated by the lever arm, and engagement of the attached lid and housing with the container causes the lever arm to rotate into contact with the switch in the second engaged position to close the switch and allow operation of the motor.

10. The food processor of claim 1, wherein the storage containers are formed from a polymeric material.

11. The food processor of claim 1, wherein the storage containers are formed from a glass material.

12. The food processor of claim 1, further comprising at least one storage lid removably engageable with the open end of at least one of the storage containers for enclosing the interior of the storage container when the storage container is detached from the lid on the housing.

13. The food processor of claim 1, wherein the at least one food processing tool includes a tool shaft and a processing implement disposed on the tool shaft.

14. The food processor of claim 13, wherein the tool shaft has a first end removably engaged with the output shaft to rotate therewith and a second free end opposite the first end, the processing implement being slidable along the tool shaft during operation of the food processor.

15. The food processor of claim 14, wherein the processing implement slides from a position proximate the first end of the tool shaft to a position proximate the second end of the tool shaft due to at least one of interaction with the foodstuff being processed and gravity.

16. The food processor of claim 1, wherein the at least one food processing tool extends through the open end and within the interior of the attached storage container for the processing of foodstuffs therein.

17. A food processor for processing foodstuffs, comprising:
a housing having a top portion and a bottom portion;
a motor disposed within the housing;
a lid having a top surface removably engageable with the bottom portion of the housing;
a feed chute extending outwardly from the top surface of the lid;
an output shaft extending outwardly from the housing, the output shaft operably connected with the motor, such that operation of the motor causes the output shaft to rotate;
at least one food processing tool removably engageable with the output shaft to rotate therewith; and
at least one storage container for attachment with the lid, the storage container having an open end, a closed end and an interior therebetween, the lid being attached proximate the open end of the storage container, so that, with the storage container attached to the lid, the at least one food processing tool extends through the open end and within the interior of the storage container for the processing of foodstuffs therein, wherein the storage container is detachable from the lid to store the processed foodstuffs therein, the storage container including at least one storage lid removably engageable with the open end of the storage container for enclosing the interior of the storage container when the storage container is detached from the lid.

18. The food processor of claim 17, wherein the at least one storage container is disposable.

19. The food processor of claim 17, further comprising a container for attachment with the lid, the container being sized and shaped to receive the at least one storage container, such that the storage container is retained within the container during the processing of foodstuffs, the container having greater rigidity than that of the storage container.

20. The food processor of claim 19, wherein the container includes a compartment for the storage of the at least one food processing tool when not being used to process foodstuffs.

21. The food processor of claim 19, wherein the container can be used without the at least one storage container to process foodstuffs within the container.

22. The food processor of claim 19, wherein the lid is removably engageable with the container.

23. The food processor of claim 22, further comprising an interlock mechanism operably coupled with the motor for allowing operation of the motor only when the lid is attached to the container and the housing is engaged with the lid.

24. The food processor of claim 23, wherein the interlock mechanism includes a movable switch and a pivotable lever arm, such that engagement of the housing with the lid causes the switch to move from a first disengaged position where the switch cannot be actuated by the lever arm to a second engaged position where the switch can be actuated by the lever arm, and engagement of the attached lid and housing with the container causes the lever arm to rotate into contact with the switch in the second engaged position to close the switch and allow operation of the motor.

25. The food processor of claim 17, wherein the at least one storage container is formed from a polymeric material.

26. The food processor of claim 17, wherein the at least one storage container is formed from a glass material.

27. The food processor of claim 17, wherein the at least one food processing tool includes a tool shaft and a processing implement slidingly disposed on the tool shaft.

28. The food processor of claim 27, wherein the tool shaft has a first end removably engaged with the output shaft to rotate therewith and a second free end opposite the first end, the processing implement sliding along the tool shaft during operation of the food processor.

29. The food processor of claim 28, wherein the processing implement slides from a position proximate the first end of the tool shaft to a position proximate the second end of the tool shaft due to at least one of interaction with the foodstuff being processed and gravity.

* * * * *